Aug. 25, 1931.  F. A. KELLAR  1,820,537
APPARATUS FOR USE IN AND METHOD OF ASSEMBLING SPRING CONSTRUCTIONS
Filed Jan. 17, 1930    2 Sheets-Sheet 2
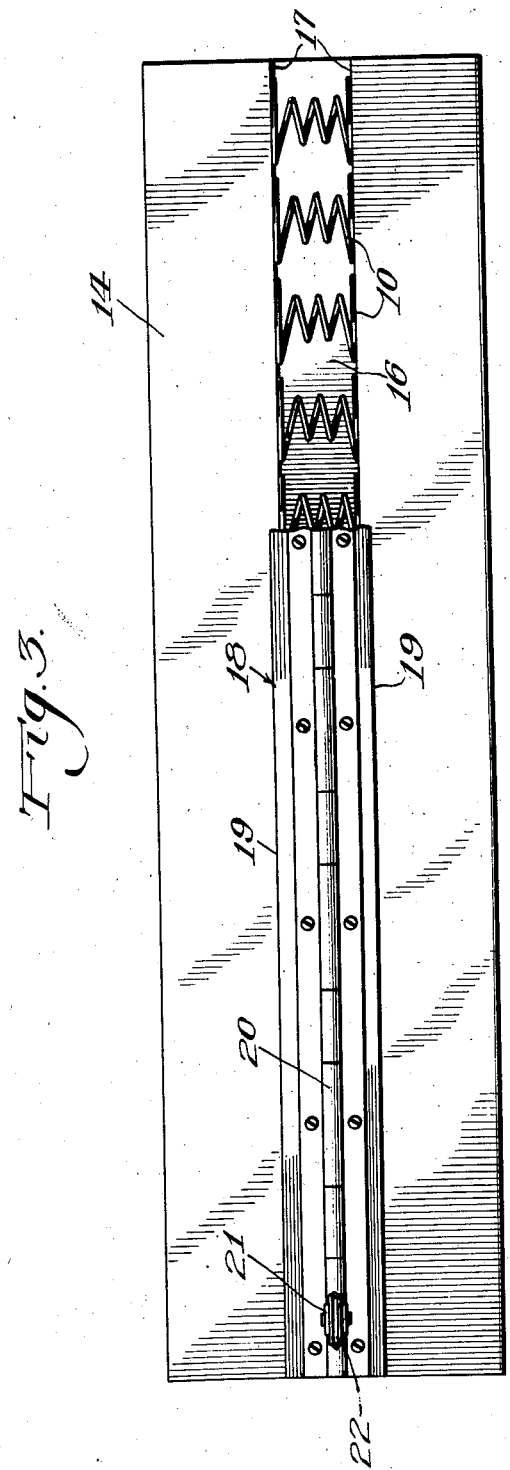
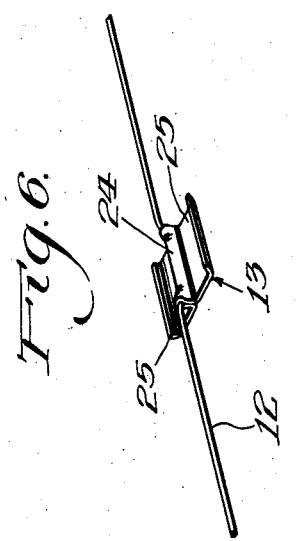
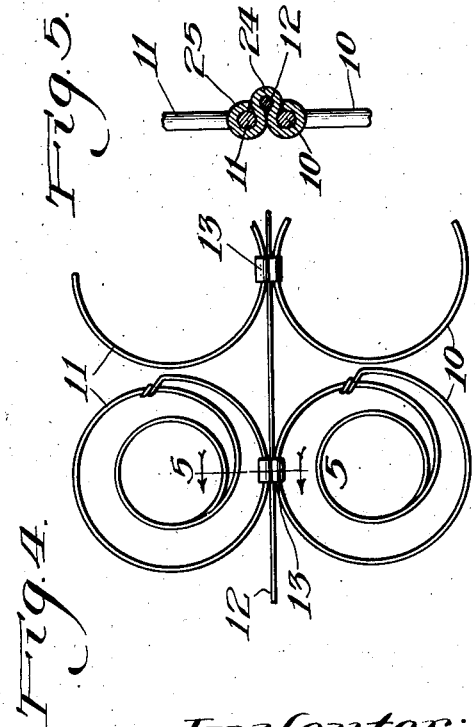

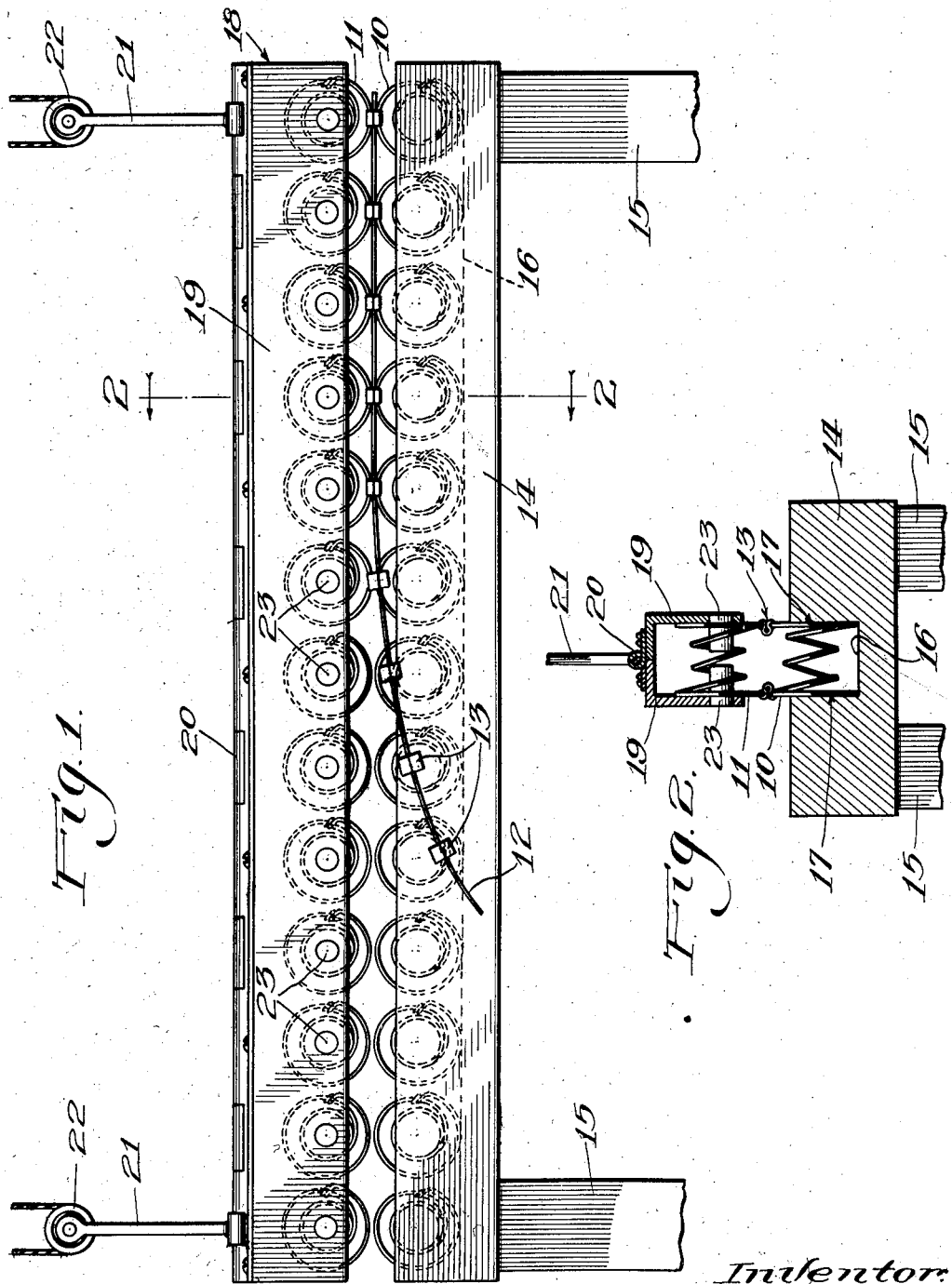

Patented Aug. 25, 1931

1,820,537

UNITED STATES PATENT OFFICE

FRANCIS A. KELLAR, OF GRAND RAPIDS, MICHIGAN

APPARATUS FOR USE IN AND METHOD OF ASSEMBLING SPRING CONSTRUCTIONS

Application filed January 17, 1930. Serial No. 421,506.

This invention relates to apparatus for use in and method of assembling spring constructions adapted for embodiment in mattresses, furniture seats and the like.

In my application for United States Letters Patent on spring construction, filed herewith, I have described in detail the construction which is produced by the use of the apparatus and method of the present invention. This spring construction comprises rows of springs in which the springs of one row are not directly connected to each other but are indirectly connected and held in proper position relative to each other, and in which the springs of one row are connected to the adjacent springs of another row, by novel connecting means. The spring connecting means, which is prepared as a unit, comprises a longitudinally extending wire having secured thereto at intervals spring clips which are fixed thereto in spaced relation to correspond with the distance from center to center between the springs of each row of springs.

The apparatus for use in assembling spring constructions such as herein referred to embodies means for holding a row of springs and means for holding other springs in convenient proximity to said first row of springs for the purpose of applying to the springs the connecting means herein referred to.

The main object of the invention is to provide an apparatus simple in construction and easy to handle by which a spring structure of the type described may be assembled at a cost substantially below the cost of producing spring structures by other methods and by using other apparatus.

In the drawings:—

Fig. 1 is a front elevation of an apparatus embodying my invention, the same being shown with two rows of springs in position in the apparatus, some of the springs of the two rows having been connected together.

Fig. 2 is a transverse vertical sectional view taken on the line 2—2 of Fig. 1.

Fig. 3 is a top plan view of the apparatus shown in Fig. 1 with part of the structure broken away to show springs in position in the table of the apparatus.

Fig. 4 is a plan view of part of a spring structure produced by the use of the apparatus and method of the present invention.

Fig. 5 is a sectional view taken on the line 5—5 of Fig. 4.

Fig. 6 is a perspective view of the spring connecting means.

Referring first to Figs. 4 to 6 of the drawings, it will be understood from the description herein and the more complete description in my co-pending application that the spring structure to be produced by the use of the present invention comprises a plurality of coiled springs arranged in longitudinally extending rows, such as the springs 10 of one row and the springs 11 of another row. The springs of each row are held in desired position relative to each other and the springs 10 of one row are connected to the adjacent springs 11 of the next row by a novel connecting means comprising a length of wire 12 having secured thereto clips indicated as a whole at 13. The spacing of the clips 13 on the wire 12 is predetermined by the distance from center to center of the springs in one of the rows of springs. The spring connecting means and the structure produced by the combination of coil springs and connecting means are the subject of my co-pending application, Serial No. 421,507, filed January 17, 1930, but the particular form of connecting means shown is not essential in the use of the apparatus and method of the present invention.

Referring now to Figs. 1 to 3, inclusive, a table or support is indicated at 14, the same being supported upon legs 15. The table top 14 is provided with a groove which extends longitudinally of the table and has a floor 16 parallel to the table top and side walls 17 at right angles to the floor 16. The groove is of less depth than the diameter of the spring, such as indicated at 10, to be held in the groove. Preferably the end coils of the spring 10 protrude at least an inch above the top surface of the table 14. The width of the groove or distance between the walls 17 is preferably slightly less than the axial length of the spring 10.

Above the table 14, there is suspended a spring holder indicated as a whole at 18. The same comprises two L-shaped walls 19 hinged together along their longitudinal margins by a hinge 20 to form an open bottom box-like structure which extends longitudinally of the table above the groove 16. The holder 18 may be suspended by any desired means, such as the link 21 and pulley 22, whereby the holder may be lowered and raised. The downwardly extending portions of the L-shaped walls 19 of the holder are spaced apart from each other a distance equal to the distance between the walls 17 of the groove in the table 14, and extending inwardly from each of the walls 19 near the bottom longitudinal margin of each of said walls is a plurality of spools indicated at 23. The spools 23 on one wall 19 are spaced apart from each other, from center to center, a distance equal to the distance from center to center of the springs 10—10, forming one row in the spring structure to be produced. The spools 23 on the opposite wall 19 are similarly spaced and positioned opposite the first mentioned spools 23. The spools are so located on the wall 19 that when a spring such as that indicated at 11 in Fig. 2 is placed in position over a pair of spools 23, the end coils of the spring 11 will depend below the walls 19 to a desired extent, preferably about one inch.

To facilitate placing the springs in the holder, the holder may be lowered so that one of the walls 19 rests upon its side on the table and the other wall 19 may be moved on the hinge 20 to open the holder. The springs 11 are then placed over the spools 23, one spring for each spool on one of the walls 19, and then the other hinged wall 19 is moved to close the holder and bring the ends of the oppositely positioned spools 23 into proximity with each other. The holder 18 may be raised by any desired means. A number of springs 10 having been dropped into the groove in the table 14, the operator is now ready to adjust the holder 18 relative to the table 14 so that the end coils of the springs 10 and 11 will be near each other as shown in Fig. 1, although not in contact. Then the operator holds the connecting means, manually moves a spring 10 into position beneath a spring 11, inserts the median partition 24 of the connecting means between the proximate end coils of the springs 10 and 11, and then by any convenient means, such as a hand press, clinches the side members 25 of the clips 13 about said coils of adjacent springs 10 and 11.

The operator now moves to the next pair of springs 10, 11, or if desired the table and holder may be in the form of traveling conveyors. Having brought the next spring 10 into proximity to the next spring 11, a second clip 13 is applied, and the operation repeated as often as is required. The length of the wire 12 between adjacent clips 13 of the connecting means will correspond with the distance between adjacent springs 11 from center to center in the holder 18.

In Fig. 1, five of the springs 10 are shown as connected to five corresponding springs 11, and the unused connecting means 12, 13 is shown hanging downwardly ready for application to the remaining springs to form two connected rows extending longitudinally of the spring structure. After the springs 10 of one row have been connected to the springs 11 of another row, the holder 18 is moved upwardly by the suspension means and the operation is ready to be repeated; that is to say, a plurality of unconnected springs are again placed in the groove of the table and then the holder is adjusted so that the lower edges of the coils of the row of springs 10 will be close to but not in contact with the upper edges of the coils of the springs in the groove. Thereupon another length of connecting means 12, 13 is applied to the springs 10 to connect said row 10 to a third row of springs. This operation is continued until the spring construction is of desired size.

From the foregoing it will be seen that a spring structure having the springs firmly held in their intended positions is produced by a very convenient method and with a minimum of labor and expense.

Obviously, changes in details of construction may be made without departing from the scope of my invention, and I do not intend to be limited to the precise form shown and described, except as pointed out in the appended claims.

I claim:—

1. Apparatus for use in assembling spring constructions, comprising a support for a plurality of coiled springs, a holder for holding a plurality of coiled springs, and means for adjusting the position of the holder relative to the support to bring the springs in the holder into proximity to the springs on the support to enable spring connecting means to be applied to the proximate coils of the spring on the support and in the holder.

2. Apparatus for use in assembling spring constructions, comprising a table for supporting a plurality of coiled springs, the table being grooved longitudinally for reception of the springs, a holder for holding a plurality of coiled springs, said holder extending longitudinally of the table and movably mounted adjacent the groove in the table, and means for adjusting the position of the holder relative to the table to bring the coils of the respective springs in the holder into proximity to the coils of the spring on the table to enable spring connecting means to be applied to said proximate coils.

3. Apparatus for use in assembling spring constructions, comprising a support for a plurality of coiled springs, a holder for holding a plurality of coiled springs, said holder extending longitudinally of the support, and means for adjusting the position of the holder relative to the support to bring the sides of the respective springs in the holder into proximity to the sides of the springs on the support to enable spring connecting means to be applied to the proximate coils, said holder consisting of an open bottom box and spring holding devices located on the vertically disposed longitudinally extending walls of the box.

4. Apparatus for use in assembling spring constructions, comprising a support for a plurality of coiled springs, a holder for holding a row of coiled springs, said holder extending longitudinally of the support, and means for adjusting the position of the holder relative to the support to bring the sides of the respective springs in the holder into proximity to the sides of the springs on the support to enable spring connecting means to be applied to said proximate coils, said holder consisting of an open bottom box and inwardly directed spring holding devices located on the vertically disposed longitudinally extending walls of the box, the devices on one of said walls being opposite the devices on the other wall, and the devices on each wall being spaced apart from each other a predetermined distance equal to the distance, from center to center, between the springs of a row of springs intended for a spring construction.

5. Apparatus for use in assembling spring constructions, comprising a table for supporting a plurality of coiled springs, the table being grooved longitudinally for reception of the springs, a holder for holding a plurality of coiled springs, said holder extending longitudinally of the table, and means for adjusting the position of the holder relative to the table to bring the coils of the respective springs in the holder into proximity to the coils of the springs on the table, to enable spring connecting means to be applied to said proximate coils, said holder consisting of an open bottom box and inwardly directed spring holding devices located on the vertically disposed longitudinally extending walls of the box, the devices on one of said walls being opposite the devices on the other wall, and the devices on each wall being spaced apart from each other a predetermined distance equal to the distance, from center to center, between the springs of a row of springs intended for a spring construction.

6. Apparatus for use in assembling spring constructions, comprising a table for supporting a plurality of coiled springs, the table being grooved longitudinally for reception of the springs, a holder for holding a plurality of coiled springs, said holder extending longitudinally of the table, and means for adjusting the position of the holder relative to the table to bring the coils of the respective springs in the holder into proximity to the coils of the springs on the table to enable spring connecting means to be applied to said proximate coils, the groove in the table being of a width slightly less than the axial length of the springs to be held in the groove and being of a height less than the diameter of said springs.

7. Apparatus for use in assembling spring constructions, comprising a support for a plurality of coiled springs, a holder for holding a plurality of coiled springs, said holder extending longitudinally of the support, and means for adjusting the position of the holder relative to the support to bring the sides of the respective springs in the holder into proximity to the sides of the springs on the support to enable spring connecting means to be applied to the proximate coils, said holder consisting of an open bottom box and spring holding devices located on the vertically disposed longitudinally extending walls of the box, the distance between the side walls of the holder box being slightly less than the axial length of the springs to be held in the holder, and the spring holding devices being so located on said box walls that part of each spring in the holder will protrude beyond the open bottom of the box.

8. Apparatus for use in assembling spring constructions, comprising a support for a plurality of coiled springs, a holder for holding a row of coiled springs, said holder extending longitudinally of the support and movably mounted above said support, and means for adjusting the position of the holder relative to the support to bring the respective springs in the holder into proximity to the springs on the support to enable spring connecting means to be applied to the proximate coils of said springs, said holder consisting of two longitudinally extending L-shaped walls hingedly connected together longitudinally and having inwardly directed spools located on opposite walls and opposite each other.

9. The method of assembling spring constructions which consists in arranging a plurality of springs on a support with the axes of the springs transversely of the support, in arranging a row of springs in a holder in juxtaposition to the support, with the axes of said springs extending transversely of the holder, in adjusting the position of the holder relative to the support to bring the springs in the holder into proximity to the springs on the support, and in applying connecting means to the coils of said springs to connect the springs on the support to the springs in the holder.

10. The method of assembling spring constructions which consists in arranging a plurality of springs on a support with the axes of the springs transversely of the support, in arranging a row of springs in a holder, in juxtaposition to the support, with the axes of said springs extending transversely of the holder, in adjusting the position of the holder relative to the support to bring the springs in the holder into proximity to the springs on the support, in applying connecting means to the coils said springs to connect the springs on the support to the springs in the holder to form two rows of springs, in raising the holder and the connected rows of springs from the support, arranging a plurality of springs for a third row upon the support, adjusting the position of the holder to bring the springs constituting the second row into proximity to the springs on the support intended to form the third row, repeating the connecting operation, and continuing to repeat the cycle of operations until a desired number of rows of springs have been connected to each other.

11. The method of assembling spring constructions which consists in arranging a plurality of springs on a support with the axes of the springs transversely of the support, in arranging a row of springs in a holder in spaced apart relation to each other, in juxtaposition to the support, with the axes of said springs extending transversely of the holder, in adjusting the position of the holder relative to the support to bring the springs in the holder into proximity to the springs on the support, and in applying connecting means to the coils of said springs to connect the springs on the support to the springs in the holder, and to maintain the springs in each row in connected spaced apart relation relative to each other.

In testimony that I claim the foregoing as my invention, I affix my signature this 10th day of January, 1930.

FRANCIS A. KELLAR.